| United States Patent [19]
Sumiyoshi

[11] Patent Number: 5,140,421
[45] Date of Patent: Aug. 18, 1992

[54] VIDEO SIGNAL PROCESSING PULSE PRODUCING CIRCUIT

[75] Inventor: Hajime Sumiyoshi, Fukaya, Japan

[73] Assignee: Kabushiki Kaisha Toshiba, Kanagawa, Japan

[21] Appl. No.: 632,426

[22] Filed: Dec. 24, 1990

Related U.S. Application Data

[63] Continuation of Ser. No. 326,463, Mar. 20, 1989, abandoned, which is a continuation of Ser. No. 95,017, Sep. 9, 1987, abandoned.

[30] Foreign Application Priority Data

Sep. 11, 1986 [JP]  Japan ........................ 61-214282

[51] Int. Cl.$^5$ ................................. H04N 5/04
[52] U.S. Cl. ...................... 358/148; 358/171; 358/172
[58] Field of Search ............... 358/158, 148, 160, 171, 358/172, 173, 155, 156, 34, 168, 150, 188, 165; 315/384, 381; 307/540

[56] References Cited

U.S. PATENT DOCUMENTS

| 3,878,336 | 4/1975 | Balaban | 358/155 |
| 4,025,952 | 5/1977 | Eckenbrecht | 358/148 |
| 4,420,775 | 12/1983 | Yamazaki et al. | 358/339 |

FOREIGN PATENT DOCUMENTS

| 0047189 | 4/1981 | Japan | 358/148 |
| 0102173 | 8/1981 | Japan | 358/168 |

Primary Examiner—James J. Groody
Assistant Examiner—David E. Harvey
Attorney, Agent, or Firm—Finnegan, Henderson, Farabow, Garrett and Dunner

[57] ABSTRACT

A video signal processing pulse producing circuit for a video display device. The video signal includes a synchronizing signal and the device has at least one video processing element responsive to a pulse of a predetermined period. The circuit includes a circuit for generating the pulse in response to receipt of the synchronizing signal for controlling the signal processing element and a compensation circuit for generating an equivalent pulse having the predetermined period when receipt of the synchronizing signal by the pulse generating circuit is interrupted for maintaining continuous control of the video signal processing element.

7 Claims, 5 Drawing Sheets

VIDEO SIGNAL PROCESSING PULSE PRODUCING CIRCUIT

This application is a continuation of application Ser. No. 07/326,463, filed Mar. 20, 1989, now abandoned, which is a continuation of application Ser. No. 07/095,017, filed Sep. 9, 1987, now abandoned.

BACKGROUND OF THE INVENTION

1. Field of the Invention

The present invention relates to a circuit for producing a video signal processing pulse, and more particularly to an improvement of a circuit for producing a gate pulse suitable for, for example, a pedestal level clamp operation in a television receiver.

2. Description of the Prior Art

In a television receiver, the pedestal level of a video signal is clamped at a given potential produced by a DC restoration circuit. The clamp operation is carried out in a pedestal level period of the video signal.

FIG. 1 shows an example of the conventional circuit for a pedestal level clamp operation. The circuit is comprised of a pedestal level clamp circuit 10 and a video signal processing pulse producing circuit 11. A composite video signal CVS with a pedestal level which should be clamped is applied to the pedestal level clamp circuit 10 through an input terminal 12 of the pedestal level clamp circuit 10.

The pedestal level clamp circuit 10 includes a brightness adjusting circuit, as described later. In the pedestal level clamp circuit 10, the pedestal level of the composite video signal CVS is clamped to a given potential under control of the video signal processing pulse producing circuit 11. The video signal processing pulse producing circuit 11 generates a gate pulse GP in response to a horizontal synchronous signal HSS applied to an input terminal 13 of the video signal processing pulse producing circuit 11.

The horizontal synchronous signal HSS is extracted from the composite video signal CVS in a conventional manner known to those skilled in the art. The gate pulse GP is applied to a control terminal 14 of the pedestal level clamp circuit 10. Then, the composite video signal CVS, which has its pedestal level clamped to the given level, is obtained from an output terminal 15 of the pedestal level clamp circuit 10.

Referring now to FIG. 2, the pedestal level clamp circuit 10 will be described below. In FIG. 2, an input terminal 12 of the pedestal level clamp circuit 10 is connected to the base of a transistor 16. The collector of the transistor 16 is connected to a power supply terminal 17. The emitter of the transistor 16 is connected to a ground potential terminal 18 through a level shift circuit 19.

The level shift circuit 19 is comprised of a series circuit of a resistor 20 and a transistor 21. The collector of the transistor 21, i.e., a connection node of the resistor 20 and the transistor 21, is connected to the output terminal 15 of the pedestal level clamp circuit 10, and also connected to a first voltage comparator circuit 22.

In the first voltage comparator circuit 22, a pair of transistors 23 and 24 are differentially connected to each other. The base of the transistor 23 is connected to the collector of the transistor 21. The base of the transistor 24 is coupled to a brightness adjustment circuit 25.

The brightness adjustment circuit 25 is comprised of fixed resistors 26 and 27 and a variable resistor 28. A movable terminal of the variable resistor 28 is coupled to the base of the transistor 24 for applying a brightness adjustment voltage V25. The variable resistor 28 is connected at its opposite ends to the power supply terminal 17 and the ground potential terminal 18 through the resistors 26 and 27, respectively.

A common connection node of the emitters of the transistors 23 and 24 is coupled to the power supply terminal 17 through a controllable switch 29 and a first constant current source 30, in series. The controllable switch 29 is connected to the control terminal 14 of the pedestal level clamp circuit 10. The collectors of the transistors 23 and 24 are connected to the ground potential terminal 18 through an active load 31, which is formed in a current mirror configuration by transistors 32 and 33. The transistor 32 is connected to the transistor 23 of the first voltage comparator circuit 22. The transistor 33 is connected to the transistor 24 of the first voltage comparator circuit 22 and to itself in a diode fashion.

The collector of the transistor 32, i.e., the connection node of the collectors of the transistors 23 and 32 is connected to a second voltage comparator circuit 34. In the second voltage comparator circuit 34, a pair of transistors 35 and 36 are differentially connected to each other. The base of the transistor 35 is connected to the collector of the transistor 32. Further, the base of the transistor 35 is connected to the ground potential terminal 18 through a capacitor 37. The base of the transistor 36 is coupled to a first reference voltage source 38.

A common connection node of the emitters of the transistors 35 and 36 is coupled to the power supply terminal 17 through a second constant current source 39. The collector of the transistor 35 is connected to the ground potential terminal 18 through a transistor 40. The transistor 40 is itself connected in a diode fashion and forms a current mirror circuit 41 together with the transistor 21 in the level shift circuit 19. The collector of the transistor 36 is directly connected to the ground potential terminal 18.

The operation of the pedestal level clamp circuit 10 will be briefly described below. A composite video signal CVS is applied to the base of the transistor 16 through the input terminal 12. The DC level of the composite video signal CVS is shifted by the level shift circuit 19. An output of the level shift circuit 19, i.e., a level shift video signal CVS' is introduced to the output terminal 15 and also applied to the first voltage comparator circuit 22.

When the controllable switch 29 is closed, the composite video signal CVS' is compared with the brightness adjustment voltage V25 of the brightness adjustment circuit 25 in the first voltage comparator circuit 22.

If the composite video signal CVS' is higher than the brightness adjustment voltage V25, a collector current I23 of the transistor 23 decreases to a level below the collector current I24 of the transistor 24. As a result, the collector voltage Vc32 of the transistor 32 is reduced. This causes the capacitor 37 to discharge its charge through the transistor 32 of the active load 31. Accordingly, the base voltage Vb35 of the transistor 35 in the second voltage comparator circuit 34 is reduced.

The base voltage Vb35 is compared with the reference voltage V38 of the first reference voltage source 38, which is applied to the base of the transistor 36, so that the collector current I35 of the transistor 35 increases. The collector current I35 is applied to the base of the transistor 21 through the current mirror circuit 41 and increases the collector current I21 of the transistor 21.

Due to the increase of the collector current I21, the voltage drop V20 in the resistor 20 increases. As a result, the level shift circuit 19 causes the level of the composite video signal CVS' to drop. Thus, the level shift circuit 19, the first voltage comparator circuit 22, the active load 31, the capacitor 37, the second voltage comparator circuit 34 and the current mirror circuit 41 comprise a negative feedback loop for automatically adjusting the output potential V15 of the output terminal 15 to the brightness adjustment voltage V25 of the brightness adjustment circuit 25.

According to the above operation of the pedestal level clamp circuit 10, the composite video signal CVS is automatically adjusted to the brightness adjustment voltage V25 so that the pedestal level of the composite video signal CVS is clamped at the brightness adjustment voltage V25.

Referring now to FIG. 3, the video signal processing pulse producing circuit 11 will be described below. In FIG. 3, the input terminal 13 of the video signal processing pulse producing circuit 11 is connected to the base of a transistor 42. The collector of the transistor 42 is connected to a power supply terminal 17. The emitter of the transistor 42 is connected to a ground potential terminal 18 through a parallel circuit of a capacitor 43 and a third constant current source 44. The base of the transistor 42 is further connected to a third voltage comparator circuit 45.

In the third voltage comparator circuit 45, a pair of transistors 46 and 47 are differentially connected to each other. The base of the transistor 46 is connected to the emitter of the transistor 42. The base of the transistor 47 is coupled to a second reference voltage source 48. A common connection node of the emitters of the transistors 46 and 47 is coupled to the power supply terminal 17 through a fourth constant current source 49. The collector of the transistor 46 is directly connected to the ground potential terminal 18. The collector of the transistor 47 is connected to an output terminal 50 of the video signal processing pulse producing circuit 11.

The output terminal 50 is connected to the control terminal 14 of the pedestal level clamp circuit 10 (see FIG. 1). The collector of the transistor 47 is further connected to the ground potential terminal 18 through a resistor 51. A transistor 52 is connected between the output terminal 50 and the ground potential terminal 18 in parallel to the resistor 51. The base of the transistor 52 is connected to the input terminal 13 of the video signal processing pulse producing circuit 11 through a resistor 53.

The operation of the video signal processing pulse producing circuit 11 will be briefly described below, in reference to FIG. 4. FIG. 4 shows waveform graphs of signals or voltages in the video signal processing pulse producing circuit 11.

When a horizontal synchronous signal HSS, as shown by a graph A, is applied to the base of the transistor 42 through the input terminal 13 at a time t1, the transistor 42 turns on. The waveform of an emitter voltage Ve42 is shown by a graph B.

Here, it is assumed that the emitter voltage Ve42 of the transistor 42 is V1 when the horizontal synchronous signal HSS has an amplitude of V1+Vf. The emitter voltage Ve42 is charged in the capacitor 43 so that the charge of the capacitor 43 is held at the emitter voltage Ve42 during the conduction of the transistor 42. The emitter voltage Ve42 is applied to the third voltage comparator circuit 45 and compared therein with a reference voltage V48 of the second reference voltage source 48.

When the emitter voltage Ve42 is higher than the reference voltage V48 of the second reference voltage source 48, the transistors 46 and 47 of the third voltage comparator circuit 45 are held in a non-conducting state and a conducting state, respectively.

When the horizontal synchronous signal HSS ends at a time t2, the transistor 42 is turned off. Then, the charge of the capacitor 43 is discharged through the third constant current source 44. The discharge proceeds gradually with a prescribed RC time constant of the parallel circuit of the capacitor 43 and the third constant current source 44. Therefore, the emitter voltage Ve42 gradually decreases, as shown by the graph B.

When the emitter voltage Ve42 is lower than the reference voltage V48 of the second reference voltage source 48 at a time t3, the transistor 47 is turned off.

The horizontal synchronous signal HSS is applied to the base of the transistor 52. Accordingly, the transistor 52 maintains an output potential V50 of the output terminal 50 to a ground potential V18 within the period of the horizontal synchronous signal HSS, i.e., the period between times t1 and t2.

After the time t2, the output potential V50 of the output terminal 50 rises to a prescribed voltage. The output potential V50 then lowers to the ground potential V18 when the transistor 47 is turned off at the time t3. As a result, the output potential V50 of the output terminal 50 has a waveform, as shown by a graph C. The output potential V50 is applied to the pedestal level clamp circuit 10 as the gate pulse GP for controlling the switching of the controllable switch 29. The gate pulse GP is produced a prescribed period after the horizontal synchronous signal HSS, as shown in FIG. 4. Thus, the gate pulse GP is obtained during a period corresponding to the pedestal level of the composite video signal CVS.

As is described above, the gate pulse GP for controlling the pedestal level clamp circuit 10 is produced by using the horizontal synchronous signal HSS. Therefore, the pedestal level clamp circuit 10 fails to carry out the automatic pedestal clamp operation when the horizontal synchronous signal HSS is not obtained.

The no-signal condition of the gate pulse GP occurs, for example, when a television receiver is changed to a video mode for displaying video images reproduced by a video tape recorder but the input terminals of the television receiver are left open without being coupled to the video tape recorder.

Referring now to FIG. 2, when there is no input of the GP to the control terminal 14, the controllable switch 29 is held in an open state. Then, the current mirror circuit 41 is charged by the base current Ib35 of the transistor 35. The base voltage Vb35 of the transistor 35 increases according to the charge of the capacitor 37 until the base current Ib35 becomes zero.

The transistor 35 is turned off when the base voltage Vb35 becomes higher than the reference voltage V38 of the first reference voltage source 38. At this time, the collector current I35 of the transistor 35 becomes zero so that the collector current I21 of the transistor 21 also becomes zero. This causes the collector voltage Vc21 of the transistor 21 to increase to a potential the same as the emitter voltage Ve16 of the transistor 16.

The collector voltage Vc21 of the transistor 21 with the emitter voltage Ve16 is applied to the first voltage comparator circuit 22, but the collector voltage Vc21 is not adjusted to the brightness adjustment voltage V25 by the feedback circuit. This is because the first voltage comparator circuit 22 is held in the non-operating state due to the open state of the controllable switch 29. Therefore, the pedestal level clamp circuit 10 changes the image display screen of the television receiver to an excessive bright condition, irrespective of the adjustment of the brightness adjustment circuit 25.

The practical effect of this condition is that the frequent change of brightness of the display screen may cause more rapid failure of the screen or other television receiver components. In addition, the power consumption of the television receiver is increases.

SUMMARY OF THE INVENTION

Accordingly, an object of the present invention is to provide a circuit for producing a video processing pulse regardless of presence or absence of synchronous signals.

Another object of the present invention is to provide a video processing pulse producing circuit suitable for a pedestal level clamp circuit which carries out an automatic brightness control.

In order to achieve the above objects, a video signal processing pulse producing circuit for a video display device according to the present invention includes a circuit for generating the pulse in response to receipt of a synchronizing signal included in the video signal for controlling the signal processing element and a compensation circuit for generating an equivalent pulse having the predetermined period when receipt of the synchronizing signal by the pulse generating circuit is interrupted for maintaining continuous control of a video signal processing element included in the video display device.

In the present invention, there is provided a pulse forming circuit for producing a gate pulse by using a vertical pulse from a vertical pulse generator even in a non-input state of signals and the output of this circuit is composed in the output of a gate pulse forming circuit and the composite output thus obtained is used as a clamping pulse of a pedestal clamping circuit.

By the construction described above, a gate pulse (pedestal level clamp pulse) is always applied to a pedestal level clamp circuit even in the non-input state of signals, and there is not produced an abnormality that the brightness of a display screen is changed irrespective of adjustment at the non-input state of signals.

DESCRIPTION OF THE PREFERRED EMBODIMENTS

Figure 1:
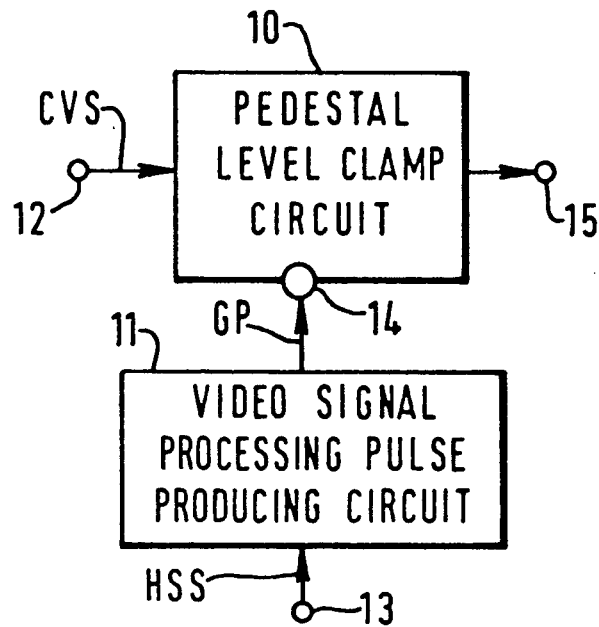
FIG. 1 is a block diagram showing a conventional system for a pedestal level clamp operation.

The present invention will now be described in detail with reference to the accompanying drawings. Throughout the drawings, like reference numerals and letters are used to designate elements like or equivalent to those used in FIGS. 1 to 4 for the sake of simplicity of explanation.

Figure 5:
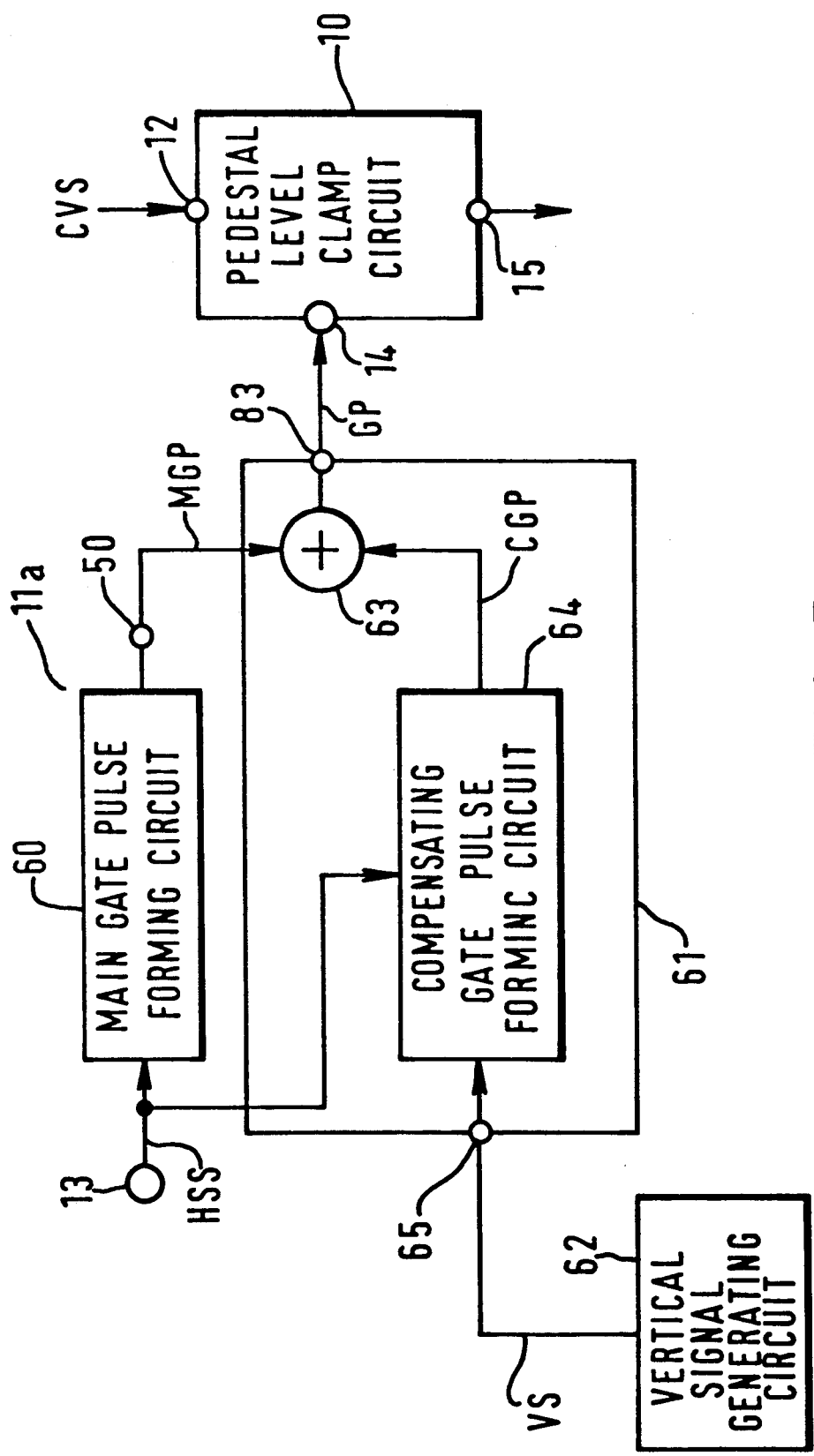
FIG. 5 is a block diagram showing a system for a pedestal level clamp operation to which a main gate pulse forming circuit according to the present invention is applied.

FIG. 5 is a block diagram showing a system for a pedestal level clamp operation to which an embodiment of the video signal processing pulse producing circuit according to the present invention is applied. In FIG. 5, the circuit is comprised of a pedestal level clamp circuit 10 and a video signal processing pulse producing circuit 11a. The video signal processing pulse producing circuit 11a includes a main gate pulse forming circuit 60, a no-input signal compensation circuit 61, and a vertical signal generating circuit 62.

Figure 2:
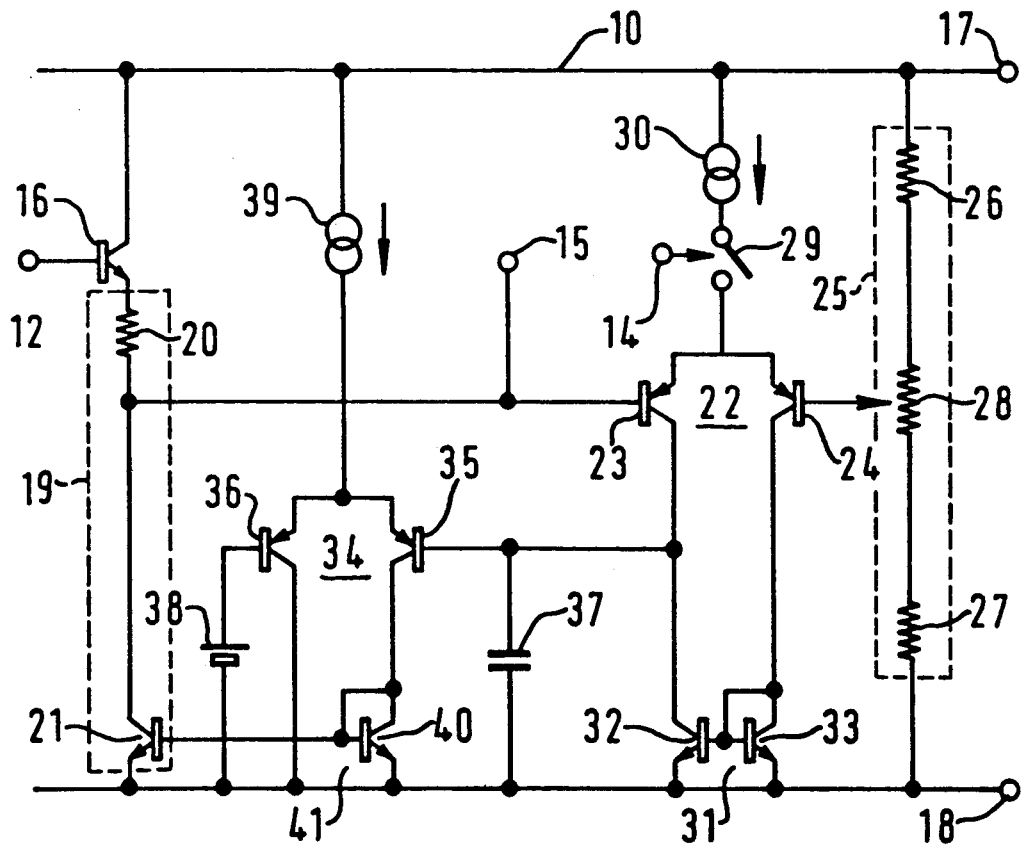
FIG. 2 is a circuit diagram showing the pedestal level clamp circuit of the system shown in FIG. 1.
Figure 3:
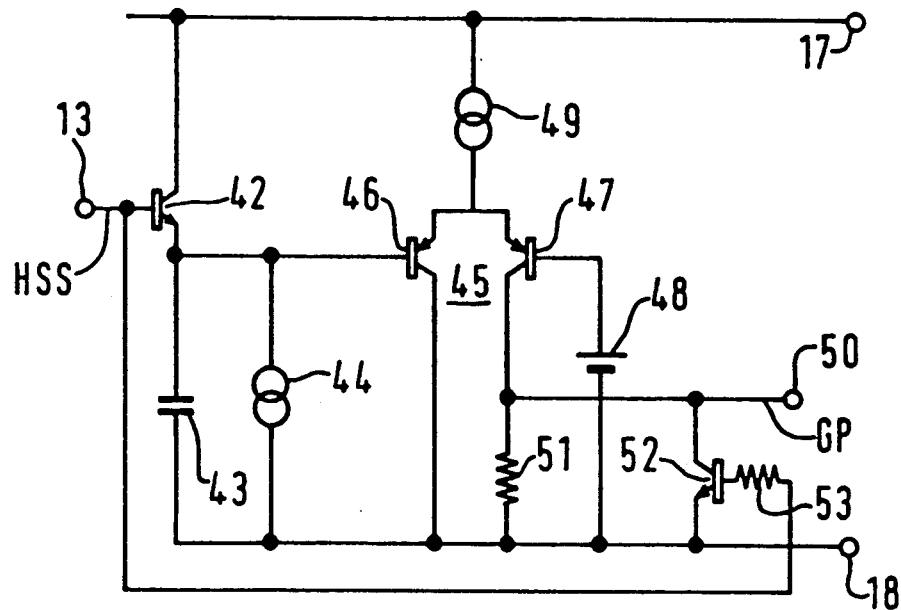
FIG. 3 is a circuit diagram showing the gate pulse forming circuit of the system shown in FIG. 1.
Figure 4:
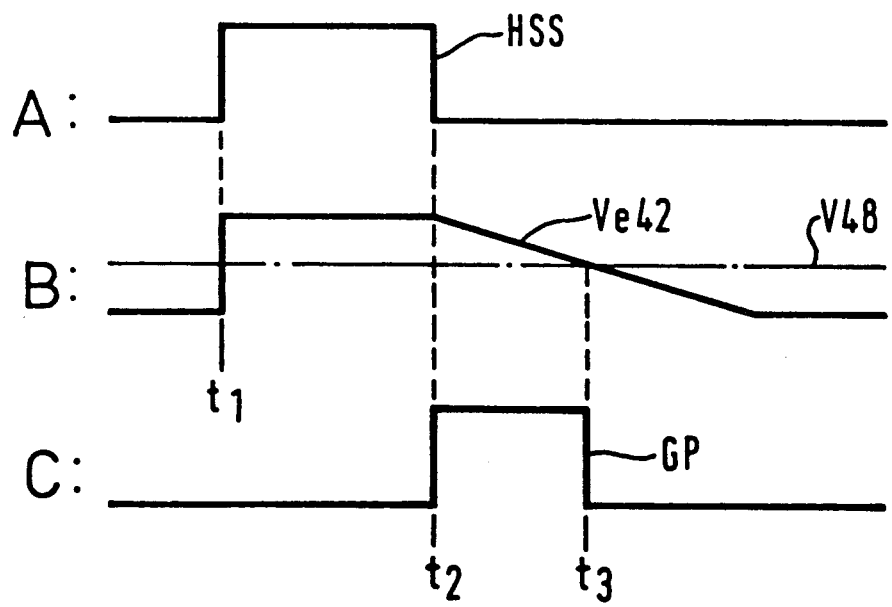
FIG. 4 is a diagram showing signal and voltage waveforms for explaining the operation of the gate pulse forming circuit of FIG. 3.

The pedestal level clamp circuit 10 is similar to the conventional one, for example, as shown in FIG. 2. Also, the main gate pulse forming circuit 60 in the video signal processing pulse producing circuit 11a is similar to the conventional one, for example, the video signal processing pulse producing circuit 11, as shown in FIG. 3.

Hereafter, the circuit of FIG. 5 will be explained by assuming that the pedestal level clamp circuit 10 and the main gate pulse forming circuit 60 of the video signal processing pulse producing circuit 11a are the same as those of FIGS. 2 and 3. Therefore, the detailed explanations for the pedestal level clamp circuit 10 and the main gate pulse forming circuit 60 of the video signal processing pulse producing circuit 11a will be omitted.

In FIG. 5, a composite video signal CVS with a pedestal level which should be clamped is applied to the pedestal level clamp circuit 10 through an input terminal 12 of the pedestal level clamp circuit 10. In the pedestal level clamp circuit 10, the pedestal level of the composite video signal CVS is clamped to a given potential under control of the video signal processing pulse producing circuit 11a.

The video signal processing pulse producing circuit 11a generates a gate pulse GP for controlling the pedestal level clamp circuit 10. The main gate pulse forming circuit 60 of the video signal processing pulse producing circuit 11a generates a main gate pulse MGP in response to a horizontal synchronous signal HSS applied to an input terminal 13 of the main gate pulse forming circuit 60. The horizontal synchronous signal HSS is extracted from the composite video signal CVS in a conventional manner.

The no-input signal compensation circuit 61 of the video signal processing pulse producing circuit 11a generates a compensating gate pulse CGP in response to a vertical signal VS applied from the vertical signal generating circuit 62. The main gate pulse MGP or the compensating gate pulse CGP is outputted as the gate pulse GP from the video signal processing pulse producing circuit 11a through an OR gate 63 of the no-input signal compensation circuit 61.

The gate pulse GP is applied to a control terminal 14 of the pedestal level clamp circuit 10. Then, the composite video signal CVS with a pedestal level clamped to the given level is obtained from an output terminal 15 of the pedestal level clamp circuit 10.

The main gate pulse forming circuit 60 produces the main gate pulse MGP in response to the horizontal synchronous signal HSS, when the composite video signal CVS is present. The main gate pulse MGP is applied through the OR gate 63 to the control terminal 14 of the pedestal level clamp circuit 10. However, the main gate pulse forming circuit 60 fails to produce the main gate pulse MGP in the absence of the composite video signal CVS, as described before.

The video signal processing pulse producing circuit 11a has the no-input signal compensation circuit 61 and the vertical signal generating circuit 62. The vertical signal generating circuit 62 generates the vertical signal VS. The horizontal synchronous signal HSS is extracted from the composite video signal CVS, as described before. On the other hand, the vertical signal VS is generated by the vertical signal generating circuit 62 which is equipped in the television receiver. The vertical signal VS is applied to the no-input signal compensation circuit 61. No detection of the absence of the horizontal synchronous signal is performed for generation of the vertical signal VS. In response to the vertical signal VS, the no-input signal compensation circuit 61 produces the compensating gate pulse CGP, like the main gate pulse MGP, as described below, for the period of the pedestal level of the composite video signal CVS.

The compensating gate pulse CGP is applied through the OR gate 63 to the control terminal 14 of the pedestal level clamp circuit 10 in the absence of the main gate pulse MGP, as described later.

The operation of the circuit of FIG. 5 will be described hereafter. The horizontal synchronous signal HSS is applied to the input terminal 13 of the main gate pulse forming circuit 60. The horizontal synchronous signal HSS is obtained by extracting it from the composite video signal CVS. The main gate pulse forming circuit 60 operates in the same manner as the video signal processing pulse producing circuit 11 in FIG. 3, so that a main gate pulse MGP is outputted from the output terminal 50 of the main gate pulse forming circuit 60 when the composite video signal CVS is present.

The main gate pulse MGP is applied to the no-input signal compensation circuit 61. The no-input signal compensation circuit 61 transmits the main gate pulse MGP as it is to the pedestal level clamp circuit 100, when the main gate pulse MGP is present. The no-input signal compensation circuit 61, however, produces the compensating gate pulse CGP and transmits the compensating gate pulse CGP to the pedestal level clamp circuit 10 in place of the main gate pulse MGP, as described later. Then, the composite video signal CVS, which has its pedestal level clamped to the given level, is obtained from an output terminal 15 of the pedestal level clamp circuit 10.

The no-input signal compensation circuit 61 operates to compensate the no-signal output of the main gate pulse MGP. The no-signal output state of the main gate pulse MGP occurs, for example, when a television receiver is changed to a video mode for displaying video images reproduced by a video tape recorder but the input terminals of the television receiver are left open without being coupled to the video tape recorder.

Figure 6:
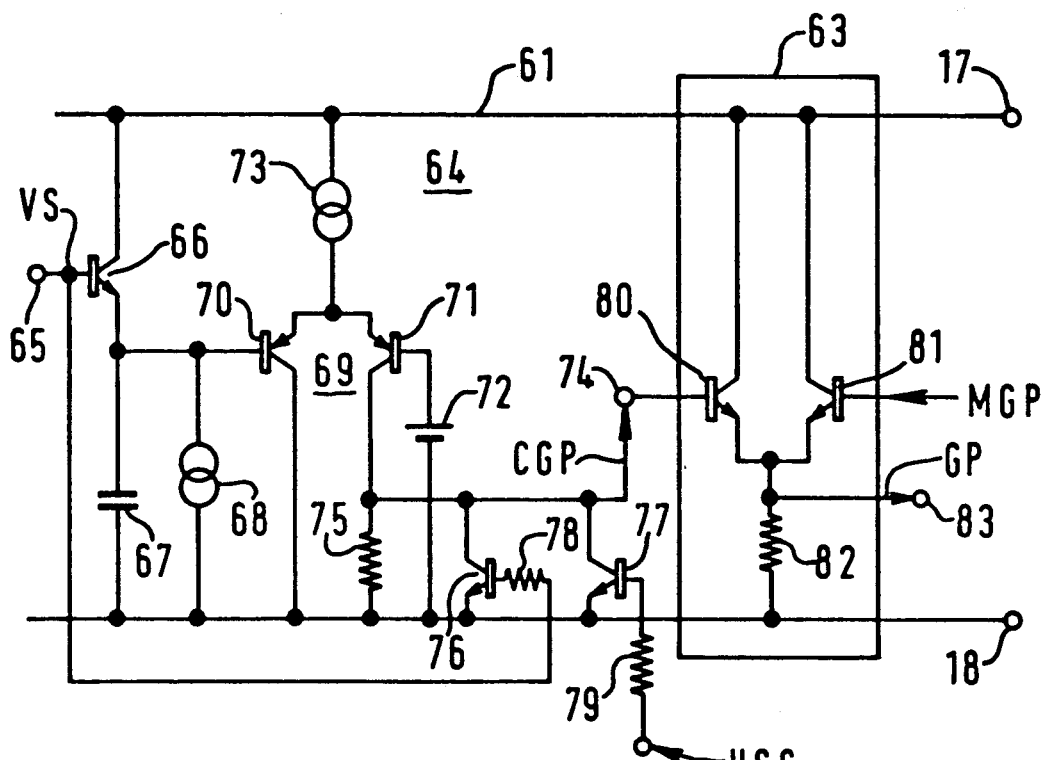
FIG. 6 is a circuit diagram showing an embodiment of the compensating gate pulse forming circuit in FIG. 5.

Referring now to FIG. 6, the no-input signal compensation circuit 61 will be described in detail. The no-input signal compensation circuit 61 is comprised of a compensating gate pulse forming circuit 64 and the OR gate 63. In the compensating gate pulse forming circuit 64, an input terminal 65 for receiving the vertical signal VS is connected to the base of a transistor 66. The collector of the transistor 66 is connected to a power supply terminal 17 through a parallel circuit of a capacitor 67 and a fifth constant current source 68. The base of the transistor 66 is further connected to a fourth voltage comparator circuit 69.

In the fourth voltage comparator circuit 69, a pair of transistors 70 and 71 are differentially connected to each other. The base of the transistor 70 is connected to the emitter of the transistor 66. The base of the transistor 71 is coupled to a third reference voltage source 72. A common connection node of the emitters of the transistors 70 and 71 is coupled to the power supply terminal 17 through a sixth constant current source 73.

The collector of the transistor 70 is directly connected to the ground potential terminal 18. The collector of the transistor 71 is connected to an output terminal 74 of the compensating gate pulse forming circuit 64. The output terminal 74 is connected to the OR gate 63. The collector of the transistor 71 is further connected to the ground potential terminal 18 through a resistor 75.

A pair of transistors 76 and 77 are connected between the output terminal 74 and the ground potential terminal 18 in parallel to the resistor 75. The base of the transistor 76 is connected to the input terminal 65 of the compensating gate pulse forming circuit 64 through a resistor 78. The base of the transistor 77 is connected to the input terminal 13 of the main gate pulse forming circuit 60 through a resistor 79.

The OR gate 63 includes a pair of transistors 80 and 81 connected together in a differential circuit configuration. The collectors of the transistors 80 and 81 are directly coupled to the power supply terminal 17. The emitters of the transistors 80 and 81 are connected in common and then connected to the ground potential terminal 18 through a resistor 82. The connection node of the emitters is connected to an output terminal 83 of the video signal processing pulse producing circuit 11a.

Figure 7:
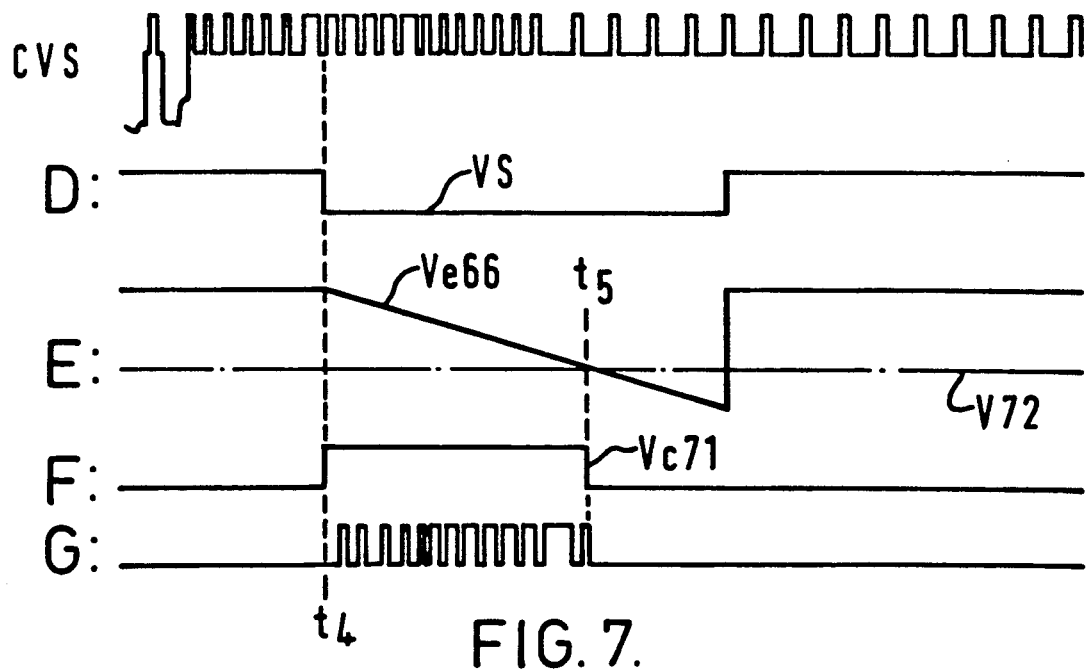
FIG. 7 is a diagram showing signal and voltage waveforms for explaining the operation of the compensating gate pulse forming circuit of FIG. 6.

Referring now to FIG. 7, the operation of the no-input signal compensation circuit 61 will be briefly described below. FIG. 7 shows waveform graphs of signals or voltages in the no-input signal compensation circuit 61.

The vertical signal generating circuit 62 generates a vertical signal VS. The vertical signal VS has a negative pulse, as shown by a graph D. When the vertical signal VS is applied to the base of the transistor 66 through the input terminal 65 at a time t4, the transistor 66 turns off. The transistor 66 is in the conductive state before the time t4.

Here, it is assumed that, during the conductive state of the transistor 66, an emitter voltage Ve66 of the transistor 66 has a potential of V2 when the vertical signal VS has an amplitude of V2+Vf in the negative direction. Therefore, the waveform of the emitter voltage Ve66 of the transistor 66 is present, as shown by a graph E. The emitter voltage Ve66 is charged in the capacitor 67 so that the charge of the capacitor 67 is held at the voltage V2 while the transistor 66 is conductive. The emitter voltage Ve66 is applied to the fourth voltage comparator circuit 69 and compared therein with a reference voltage V72 of the third reference voltage source 72.

When the emitter voltage Ve66 is higher than the reference voltage V72 of the third reference voltage source 72, the transistors 70 and 71 of the fourth voltage comparator circuit 69 are held in a non-conducting state and a conducting state, respectively.

When the vertical signal VS comes to the leading edge of the negative pulse at the time t4, the transistor 66 is turned off. Then, the charge of the capacitor 67 is discharged through the fifth constant current source 68. The discharge proceeds gradually with a prescribed RC time constant of the parallel circuit of the capacitor 67 and the fifth constant current source 68. Therefore, the emitter voltage Ve66 gradually decreases, as shown by the graph E.

During a period before the time t5 that the emitter voltage Ve66 is higher than the reference voltage V72, the transistors 70 and 71 are non-conductive and conductive, respectively. Therefore, the transistor 71 flows a collector current 17 through the resistor 75. An emitter potential Ve71 of the transistor 71 then has a prescribed voltage given by $I71 \times R75$, wherein R75 is the resistance of the resistor 75.

When the emitter voltage Ve66 is lower than the reference voltage V72 of the third reference voltage source 72 at a time t5, the transistor 71 is turned off. As a result, the collector voltage Vc71 reduces to a ground potential V18 of the ground potential terminal 18 after the time t5. The emitter voltage Ve71 is applied to the OR gate 63 as the compensating gate pulse CGP of the compensating gate pulse forming circuit 64.

The vertical signal VS is applied to the base of the transistor 76 through the resistor 78. Accordingly, the transistor 76 maintains the compensating gate pulse CGP of the compensating gate pulse forming circuit 64 at the ground potential V18 during a non-pulse period, i.e., the period before the time t4. Therefore, the compensating gate pulse CGP obtained by the compensating gate pulse forming circuit 64 has a waveform as shown by a graph F.

The compensating gate pulse CGP is applied to the base of the transistor 80 in the OR gate 63. When the compensating gate pulse CGP has the prescribed potential, the transistor 80 becomes conductive, so that a gate pulse GP responding to the compensating gate pulse CGP is obtained from the output terminal 83 of the video signal processing pulse producing circuit 11a.

On the other hand, the base of the transistor 81 of the OR gate 63 is connected to the input terminal 13 of the main gate pulse forming circuit 60 (see FIG. 5) for receiving the main gate pulse MGP. Generally, the horizontal synchronous signal HSS is obtained, except in the case where a television receiver is changed to a video mode for displaying video images reproduced by a video tape recorder, but the input terminals of the television receiver are left open without being coupled to the video tape recorder. The main gate pulse MGP is applied to the base of the transistor 81 in the OR gate 63.

When the main gate pulse MGP has the prescribed potential, the transistor 81 becomes conductive so that a gate pulse GP responding to the main gate pulse MGP is obtained from the output 83 of the video signal processing pulse producing circuit 11a.

If the composite video signal CVS includes an equivalent pulse in its vertical retrace line period, the equivalent pulse is applied to the base of the transistor 77 in the same manner as the horizontal synchronous signal HSS.

The emitter voltage Ve71 of the transistor 71 becomes a waveform as shown by a graph G. In this case, the horizontal synchronous signal HSS is also present on the input terminal 13 of the main gate pulse forming circuit 60, so that the main gate pulse MGP is applied to the base of the transistor 81 of the OR gate 63. Therefore, the pedestal level clamp operation is carried out in the pedestal level clamp circuit 10, in the same manner as described before.

The composite video signal CVS may include information data, such as data for displaying characters or letters in the vertical retrace line period corresponding to the pedestal level period of the composite video signal CVS in the general case. The information data are modulated on the composite video signal CVS in the manner of the multiplex modulation.

When such information data are included, the pedestal level clamp operation must be avoided during the period of the information data. In this case, an AND logic output between the main gate pulse MGP, as described above, and a vertical blanking pulse of the composite video signal CVS may be used for the control of the pedestal level clamp operation, in place of the gate pulse. Further, the pedestal level clamp operation may be carried out for a color control as well as the brightness control.

Figure 8:
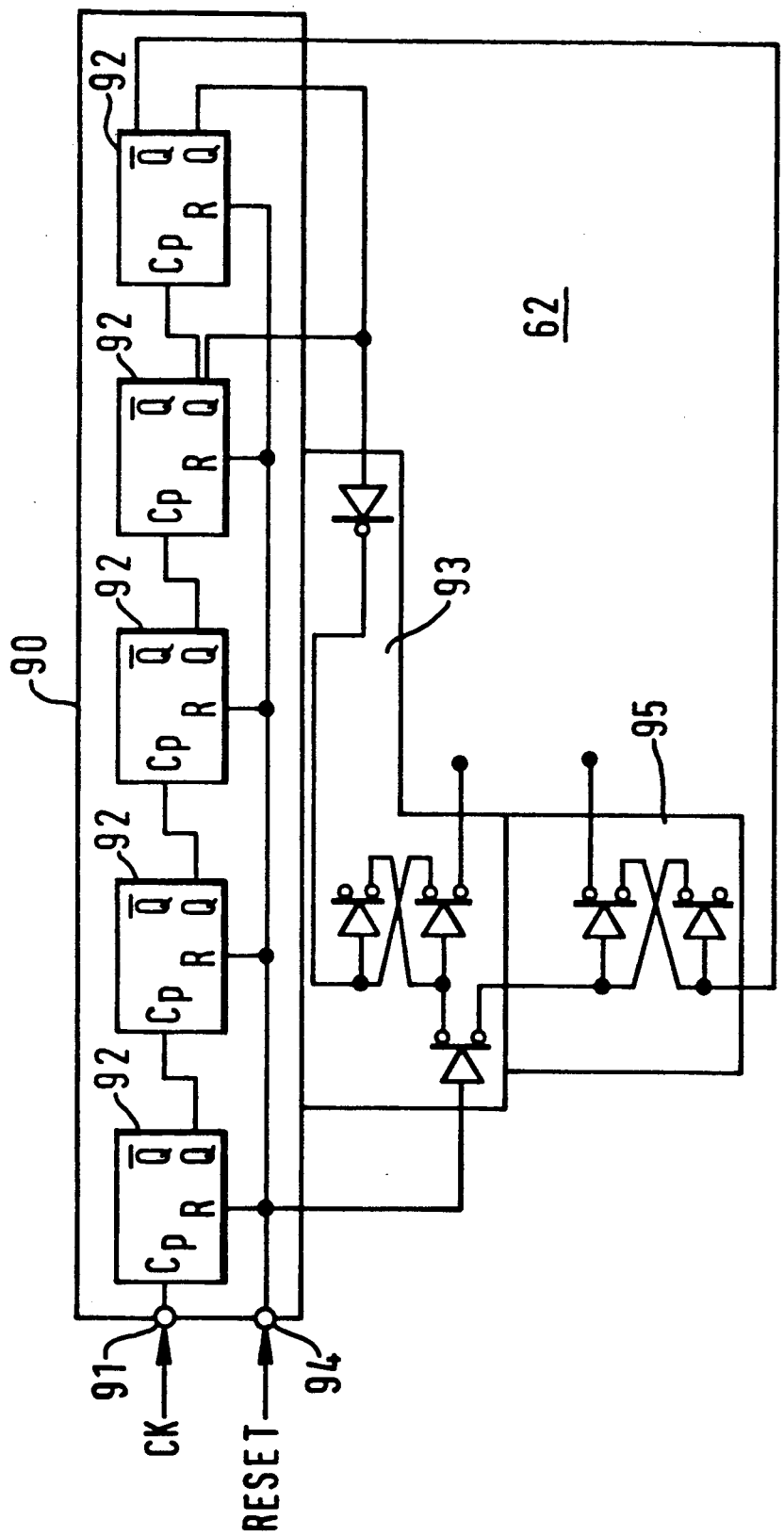
FIG. 8 is a block diagram showing another embodiment of the compensating gate pulse forming circuit of FIG. 5.

FIG. 8 shows an exemplified circuit construction of another type of a no-input signal compensation circuit 61a. The no-input signal compensation circuit 61a shown in FIG. 8 may generate a gate pulse GP in either the presence or the absence of the composite video signal. No detection of the absence of the horizontal synchronous signal is performed for generation of the gate pulse GP. The no-input signal compensation circuit 61a is comprised of a down counter 90, and first and second gate circuits 93 and 95.

The down counter 90 includes a prescribed number of flip-flops 92 provided with a clock input terminal 91 and a reset input terminal 94 for receiving a clock CK with a frequency of $2 \times fH$ (fH is a horizontal frequency of the horizontal synchronous signal HSS) and a vertical synchronous signal VSS of the composite video signal CVS, respectively. As is well known, the vertical synchronous signal VSS is located in the vertical retrace line period of the composite video signal CVS.

Therefore, the down counter 90 carries out its count operation in synchronism with the vertical synchronous signal VSS, when the composite video signal CVS is present. Otherwise, the down counter 90 carries out its count operation in the free-run state.

Count outputs of the down counter 90 are applied to the first and second gate circuits 93 and 95, respectively. The first gate circuit 93 is constructed so that the gate circuit 93 outputs a vertical blanking pulse with a period of 10H (H is a horizontal line period) for use in general video signal processing in the television receiver. The second gate circuit 95 is constructed so that the gate circuit 95 outputs another compensating gate pulse CGP' with a period of 8H. When, the compensating gate pulse CGP' is applied to the pedestal level clamp circuit 10, the pedestal level clamp circuit 10 carries out the pedestal level clamp operation during the vertical horizontal signal period of the composite video signal CVS. As a result, the no-input signal compensation circuit 61a may carry out the pedestal level clamp operation in the period of the vertical retrace line period as well in the pedestal level period after the horizontal synchronous signal HSS.

According to the present invention, as described above, an auxiliary compensation gate pulse can be obtained even if a no-input state of the synchronizing signal occurs. Therefore, video signal processing, e.g., a brightness control for a display screen, is carried out even when a television receiver is changed to a video mode for displaying video images reproduced by a video tape recorder, but the input terminals of the television receiver are left open without being coupled to the video tape recorder.

When the composite video signal CVS is present, the vertical signal VS is synchronized with the composite video signal CVS by the vertical signal VSS applied to the reset terminal 94. When the composite video signal CVS is not present, the down counter 90 oscillates in a free-run state, but generates the vertical signal VS with a vertical frequency.

While there has been illustrated and described what are at present considered to be preferred embodiments of the present invention, it will be understood by those skilled in the art that various changes and modifications may be made, and equivalents may be substituted for elements thereof without departing from the true scope of the invention.

In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A video signal processing circuit for producing an output gate pulse, said signal processing circuit being coupled to receive an externally generated synchronizing signal, said signal processing circuit comprising:
   main gate pulse forming means, operatively coupled to receive said synchronizing signal, for outputting a first gate pulse in response to said synchronizing signal;
   means for generating a timing signal;
   compensating gate pulse forming means, operatively coupled to receive said synchronizing signal and said timing signal, for generating a second gate pulse in response to both said synchronizing signal and said timing signal when both said synchronizing signal and said timing signal are present, and for generating said second gate pulse in response to only said timing signal when only said timing signal is present; and
   outputting means, operatively coupled to receive said first and second gate pulses, for outputting said output gate pulse.

2. The video signal processing circuit of claim 1 wherein said outputting means comprises OR gate means for performing a logical OR operation on said first and second gate pulses respectively outputted by said main gate pulse forming means and the compensating gate pulse forming means and for outputting said output gate pulse as a result of the logical OR operation.

3. The video signal processing circuit of claim 1 wherein said timing signal is a vertical signal.

4. The video signal processing circuit of claim 3 wherein said means for generating a timing signal is a vertical signal generating circuit.

5. A video signal processing circuit for producing a gate pulse, said signal processing circuit being coupled to receive an externally generated synchronizing signal and a clock signal, said signal processing circuit comprising:
   counter means, operatively coupled to receive said clock signal and said synchronizing signal, for generating a counter output signal in response to both said clock signal and said synchronizing signal when both said synchronizing signal and said clock signal are present, and for generating said counter output signal in response to only said clock signal when only said clock signal is present; and
   gate circuit means, operatively coupled to receive said counter output signal and said synchronizing signal, for generating said gate pulse in response to said counter output signal and said synchronizing signal when both said counter output signal and said synchronizing signal are present, and for generating said gate pulse in response to only said counter output signal when only said counter output signal is present.

6. The video signal processing circuit of claim 5 wherein said counter means further comprises a down counter formed by a plurality of flip-flop circuits.

7. The video signal processing circuit of claim 5 wherein said gate circuit further comprises a latching circuit.

* * * * *